(No Model.)
N. RUGER.
CHURN.
No. 483,584. Patented Oct. 4, 1892.
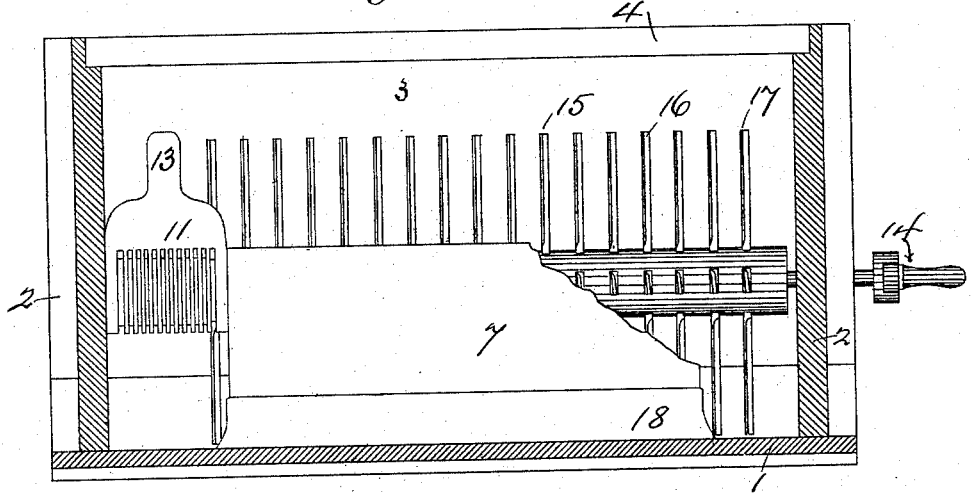
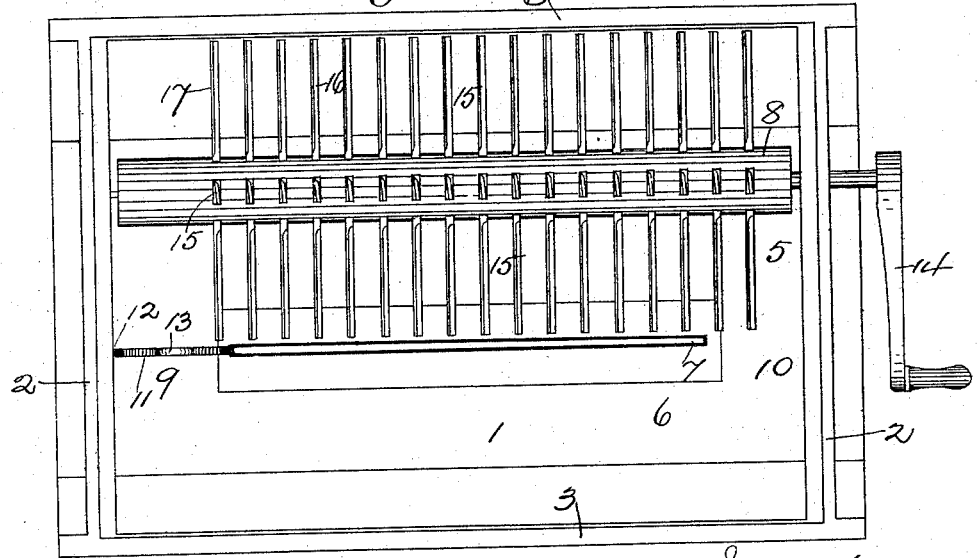
Witnesses:-
A. R. Brown
C. DeL. Beach.
Inventor:-
Nelson Ruger
By Chas J. Gooch
his Attorney.

UNITED STATES PATENT OFFICE.

NELSON RUGER, OF ELMIRA, NEW YORK.

CHURN.

SPECIFICATION forming part of Letters Patent No. 483,584, dated October 4, 1892.

Application filed February 28, 1890. Serial No. 342,132. (No model.)

*To all whom it may concern:*

Be it known that I, NELSON RUGER, a citizen of the United States, residing at Elmira, in the county of Chemung and State of New York, have invented certain new and useful Improvements in Churns; and I do hereby declare the following to be a full, clear, and exact description of the invention, such as will enable others skilled in the art to which it appertains to make and use the same.

This invention relates to improvements in that class of rotary churns in which the box or body is stationary and is provided with a rotating dasher-shaft carrying a series of dashers for agitating the cream contained within the box.

My improved churn consists of a box or case of longitudinal, square, or other suitable form divided longitudinally by a partition extending vertically preferably above the dasher-shaft and longitudinally a sufficient distance to leave at each end a passage-way connecting the divisions or chambers in the box, one of said passage-ways being guarded by a vertically-sliding grating, a horizontal dasher-shaft journaled in the ends of the box and having radially around the same in series dasher-blades, each having a concave or beveled face and thin edge for sharply cutting the cream in contradistinction to beating it, and a crank connected with the dasher-shaft by suitable gearing for rotating the same at the desired speed.

In the accompanying drawings, Figure 1 represents a sectional side elevation, partly broken away, of my improved churn. Fig. 2 represents a top plan view thereof with the cover removed.

The object sought by my present invention is to produce a churn of inexpensive and simple construction by means of which butter may be produced with the minimum labor and in the most expeditious and economical manner. Experience has demonstrated that with my churn, as herein shown and described, a quantity of cream sufficient to fill the churn up to the top of the division-strip can readily and easily be thoroughly churned into butter by any one unskilled in the art of churning, and all the butter-making qualities in the cream extracted in three minutes.

Referring to the drawings, 1 represents the bottom, 2 the ends, 3 the sides, and 4 the top, of the churn. The chamber within which the cream to be churned is placed is divided longitudinally into two compartments 5 6 by a vertical strip or partition 7, which extends upwardly, as shown in Fig. 1 of the drawings, to a point slightly above the top line of the dasher-shaft 8 and longitudinally a sufficient distance to leave passages or ways 9 10, connecting the divisional spaces or compartments 5 6. The way 10 permanently remains open and unimpeded and therethrough the butter as it is formed in the process of churning is forced by the rotary motion of the dashers into the compartment 6, where it remains out of contact with the dashers. The passage or way 9, at the opposite end of the churn, is partly guarded by a grate 11, supported and sliding vertically in suitable ways in the adjacent end of the churn-body and division-board 7, respectively.

In the drawings I have represented the grate 11 as having a grooved edge, which is guided by and slides in its reciprocal movements upon a lug or projection 12 on the adjacent end of the box, and at its outer edge having bearing and sliding on the end of the division strip or partition 7, though it is manifest that any other suitable arrangement for retaining or guiding this grate may be adopted without departing from my invention.

13 represents a handle by means of which the grate may be grasped and slid up and down, as occasion may require. The office of this grate 11 is to prevent the butter carried into the compartment 6 by the centrifugal action of the dashers passing out therefrom through the passage-way 9 back into the main compartment 5, the reticulated portion of the grate and the space below the same permitting, however, under ordinary circumstances the free passage of the buttermilk and unchurned cream from the compartment 6 to the compartment 5.

The grate 11 can be raised, as indicated in Fig. 1 of the drawings, after butter has been formed, when it may be desired to wash the butter, or when the butter having been formed its volume in the butter-receiving compartment 6 is too great to be movably affected by the impact of the liquid flowing thereinto from the compartment 5, but yet impedes the free passage of the unchurned cream or the buttermilk through the grate 11. Then said grate may be raised to permit of the passage through the passage 9 of such cream or buttermilk.

I have found in practice that by placing the division strip or partition 7 in the position indicated in the body of the churn the action of a rotary dasher located in the compartment 5 always results in the forcing of the formed butter into the compartment 6, and as the current created by dasher-blades arranged around a horizontal shaft necessarily runs in one direction it is evident, without further elaboration, that the cream, &c., in the process of churning would be forced circularly to and through the one passage-way into the butter-receiving compartments 6 and the free fluid pass out through the other passage-way back into the main compartment 5. As the globules of butter, as is well known, have a natural affinity for each other, their natural tendency when carried with the unchurned cream, in which they are contained in a compressed condition by reason of the comparative smallness of the compartment 6, into said compartment will be to combine together, and as the operation of the dashers is continuous and very rapid it results that the commingling and adherence of the butter globules will be rapid and result in the speedy formation of a mass of butter in the compartment, which mass will gradually increase in size by the adherence thereto of the butter globules projected into the compartment 6 in the passage therethrough of the incompletely-churned cream. By the construction and arrangement of the churn heretofore described the butter as formed is held in a compact mass by itself and free from any action thereon by the revolving beaters or dashers. I therefore entirely obviate the breaking up and rechurning of the butter common in those churns where the butter when formed remains in that portion of the vessel in which the dasher is located, and I also, by forcing the butter globules into the compartment 6, away from possibility of contact with the agitating mechanism, entirely prevent the adherence of any butter to either the dashers or dasher-shaft and also to the sides of the churn.

While I have in the drawings shown and will presently proceed to describe a specific construction of dasher such as I have very acceptably employed in connection with my novel arrangement of butter separator and retainer, I distinctly desire it to be understood that the churn-body, with butter separating and holding partition 7 and chamber 6, with guarded outlet 9, can be employed with other forms of dasher than shown and about to be described by me.

The dasher-shaft 8 is horizontally journaled, substantially as shown, in the ends of the box and is connected at one end with any suitable rotating mechanism—as, for instance, a crank 14—though I do not specifically confine myself to any particular form of mechanism for rotating the dasher-shaft, there being many known ways by which such a result can be accomplished.

Radially around the dasher-shaft 8 and at right angles thereto are arranged a plurality of series of dasher-blades 15. In the drawings I have shown the shaft as provided with four lines of dasher-blades; but the number of such lines may be increased at will, depending upon the circumference of the dasher-shaft and the size of the churn. These dasher-blades, it will be observed, are concaved on one face, as at 16, and have a thin edge 17. By this construction the dashers as they are rotated cleave and exert a fine cutting action upon the cream, minutely separating and cutting it up and avoiding the breaking and beating up of the globules of butter, which is a serious objection where the edges of the dasher-blades are not quite thin, as shown herein. By thus concaving or beveling the faces of the dasher-blades 15 their cleavage of the cream is most readily and easily effected, and the churning consequently accomplished much more easily and quickly and with less expenditure of power on the part of the operator than is possible where such form of blades is not employed, as the resistance offered by the cream to the passage therethrough of such dashers is greatly lessened by such formation.

In the form and size of churn shown in the drawings, which is intended to represent a churn capable of churning eight gallons of cream, the level of the cream to be churned being slightly below the top of the partition 7, are shown four rows of dasher-blades extending axially around the shaft and with seventeen blades in a row—sixty-eight in all. With such a churn having my improved form of dashers and separator 7, myself and others have repeatedly completed the churning of and extracted absolutely all the butter in the eight gallons of cream in from three to three and a half minutes.

In the use of my churn I find that, owing to the action of the thin edges 17 of the dashers, it is impossible for globules of butter to adhere to the dashers, and that by reason of the concaved sides, which, in conjunction with the thin edges, on the rotation of the dashers draw the cream, &c., to and through the passage-way 10, the adherence of butter particles to the faces of the churn is entirely prevented.

The respective corners and edges formed by the meeting of the sides, ends, &c., of the churn-body may be beaded, beveled, rounded, or otherwise constructed or covered or guarded to obviate crevices within which cream or butter might settle. The bottom portion of the partition 7 may also be guarded by curved beads, as 18, to prevent the lodgment thereagainst of butter or partially-churned cream.

The bottom of the grating 11 is ordinarily projected down about an inch and a half only below the level of the cream. As the formed butter will float on the top of the cream, &c., carried between the compartment 6, it will strike against the grating and be prevented passing through back into the compartment 5. The space below the grating 11, as shown in Fig. 1 of the drawings, affords ample opportunity to the buttermilk and partly-churned cream to pass back into the compartment 5.

What I claim is—

1. In a churn, the combination of a box, a vertical partition of less height and length than the height and length of the box, a removable vertically-tined grating having vertically-adjustable bearing at its respective sides on one end of said box and on the upper portion of the adjacent end of said partition a dasher consisting of a shaft journaled in the ends of said box at a point below the top of said partition, and a radiating series of blades having concaved faces and sharp front edges, substantially as and for the purpose set forth.

2. In a churn, the combination of a box longitudinally divided into two compartments communicating with each other at their respective ends by respectively an unimpeded passage-way and a grating-guarded passage-way, and a dasher extending longitudinally through one of said compartments and having radiating dasher-blades having concaved faces and knife-edged front edges, substantially as and for the purpose set forth.

In testimony whereof I affix my signature in presence of two witnesses.

NELSON RUGER.

Witnesses:
CHAS. J. GOOCH,
S. A. TERRY.